United States Patent [19]
Wears et al.

[11] Patent Number: 6,026,859
[45] Date of Patent: Feb. 22, 2000

[54] FLUID PRESSURE REDUCTION DEVICE WITH LINEAR FLOW CHARACTERISTIC

[75] Inventors: William Everett Wears; Michael W. McCarty, both of Marshalltown, Iowa

[73] Assignee: Fisher Controls International, Inc., Clayton, Mo.

[21] Appl. No.: 09/236,826

[22] Filed: Jan. 25, 1999

Related U.S. Application Data

[60] Provisional application No. 60/072,836, Jan. 28, 1998.

[51] Int. Cl.⁷ .................................. F16K 3/24; F15D 1/02
[52] U.S. Cl. ....................... 137/625.33; 251/127; 138/42
[58] Field of Search ........................... 137/625.3, 625.33; 251/127; 138/42

[56] References Cited

U.S. PATENT DOCUMENTS

| | | |
|---|---|---|
| Re. 31,105 | 12/1982 | Bates, Jr. . |
| Re. 32,197 | 7/1986 | Self . |
| 1,243,134 | 10/1917 | Binckley . |
| 1,650,196 | 11/1927 | Demuth . |
| 2,126,991 | 8/1938 | Griswold . |
| 3,133,557 | 5/1964 | Gongwer . |
| 3,316,936 | 5/1967 | Gongwer . |
| 3,323,550 | 6/1967 | Lee, II . |
| 3,375,855 | 4/1968 | Deeks . |
| 3,451,404 | 6/1969 | Self . |
| 3,513,864 | 5/1970 | Self . |
| 3,514,074 | 5/1970 | Self . |
| 3,529,628 | 9/1970 | Cummins . |
| 3,532,126 | 10/1970 | Boothe . |
| 3,631,891 | 1/1972 | Brumm . |
| 3,678,963 | 7/1972 | Betts et al. . |
| 3,688,800 | 9/1972 | Hayner et al. . |
| 3,722,854 | 3/1973 | Parola . |
| 3,780,767 | 12/1973 | Borg et al. . |
| 3,802,537 | 4/1974 | White . |
| 3,813,079 | 5/1974 | Baumann et al. . |
| 3,856,049 | 12/1974 | Scull . |
| 3,894,716 | 7/1975 | Barb . |
| 3,899,001 | 8/1975 | Orme . |
| 3,908,698 | 9/1975 | Baumann . |
| 3,917,221 | 11/1975 | Kubota et al. . |
| 3,921,668 | 11/1975 | Self . |
| 3,941,350 | 3/1976 | Kluczynski . |
| 3,954,124 | 5/1976 | Self . |
| 3,971,411 | 7/1976 | Baumann . |
| 3,978,891 | 9/1976 | Vick . |
| 3,995,664 | 12/1976 | Nelson . |
| 4,008,737 | 2/1977 | Kluczynski et al. . |
| 4,024,891 | 5/1977 | Engel et al. . |
| 4,060,099 | 11/1977 | Bates, Jr. . |
| 4,068,683 | 1/1978 | Self . |
| 4,079,754 | 3/1978 | Porter . |
| 4,105,048 | 8/1978 | Self . |
| 4,125,129 | 11/1978 | Baumann . |
| 4,127,146 | 11/1978 | Self . |

(List continued on next page.)

FOREIGN PATENT DOCUMENTS

| | | |
|---|---|---|
| 515165 | of 0000 | Australia . |
| 273597 | 1/1927 | United Kingdom . |
| WO 9748930 | 12/1997 | WIPO . |

OTHER PUBLICATIONS

Article—"Coefficients and Factors Relating to the Aerodynamic Sound Level Generated by Throttling Valves", H.D. Baumann, *Noise Control Engineering Journal*, Jan. Feb. 1984, pp 6–11.

*Primary Examiner*—John Fox
*Attorney, Agent, or Firm*—Marshall, O'Toole, Gerstein, Murray & Borun

[57] ABSTRACT

A fluid pressure reduction device with stacked disks. Flow disks with inlet stage slots and outlet stage slots alternate with plenum disks having plenums and bypass slots. The bypass slots are aligned with the inlet stage slots so the flow capacity increases continually in a substantially linear manner when used in a flow control valve and the valve flow control element uncovers more of the stacked disk flow inlet openings.

5 Claims, 5 Drawing Sheets

U.S. PATENT DOCUMENTS

| | | |
|---|---|---|
| 4,221,037 | 9/1980 | Seger . |
| 4,249,574 | 2/1981 | Schnall et al. . |
| 4,258,750 | 3/1981 | Schnall et al. . |
| 4,267,045 | 5/1981 | Hoof . |
| 4,279,274 | 7/1981 | Seger . |
| 4,327,757 | 5/1982 | Weevers . |
| 4,335,744 | 6/1982 | Bey . |
| 4,352,373 | 10/1982 | Kay et al. . |
| 4,356,843 | 11/1982 | Baumann . |
| 4,398,563 | 8/1983 | Kay et al. . |
| 4,407,327 | 10/1983 | Hanson et al. . |
| 4,429,714 | 2/1984 | Hughes et al. . |
| 4,456,033 | 6/1984 | Kay et al. . |
| 4,473,210 | 9/1984 | Brighton . |
| 4,479,510 | 10/1984 | Bey . |
| 4,567,915 | 2/1986 | Bates et al. . |
| 4,617,963 | 10/1986 | Stares . |
| 4,665,946 | 5/1987 | Hulsey . |
| 4,671,321 | 6/1987 | Paetzel et al. . |
| 4,921,014 | 5/1990 | Tartaglia et al. . |
| 4,938,450 | 7/1990 | Tripp et al. . |
| 5,020,571 | 6/1991 | Tartaglia et al. . |
| 5,390,896 | 2/1995 | Smirl . |
| 5,687,763 | 11/1997 | Steinke . |
| 5,732,738 | 3/1998 | Graham . |
| 5,769,122 | 6/1998 | Baumann et al. ............ 137/625.33 |
| 5,819,803 | 10/1998 | Lebo et al. ............................ 138/42 |
| 5,941,281 | 8/1999 | Baumann et al. ............ 137/625.33 |

FLUID PRESSURE REDUCTION DEVICE
WITH LINEAR FLOW CHARACTERISTIC

This application is based on provisional application, Ser. No. 60/072,836, filed Jan. 28, 1998.

This invention relates to fluid energy dissipation devices and in particular to a fluid pressure reduction device with low acoustical conversion efficiency for gas flows and also for devices with anti-cavitation and hence low noise properties as designed for liquid flows.

BACKGROUND OF THE INVENTION

In the control of fluid in industrial processes, such as oil and gas pipeline systems, chemical processes, etc., it is often necessary to reduce the pressure of a fluid. Adjustable flow restriction devices such as flow control valves and fluid regulators and other fixed fluid restriction devices such as diffusers, silencers, and other back pressure devices are utilized for this task. The purpose of the fluid control valve and/or other fluid restricting device in a given application may be to control flow rate or other process variables, but the restriction induces a pressure reduction inherently as a by-product of its flow control function.

Currently there are available fluid control valves containing a valve trim in the form of stacked disks forming a fluid pressure reduction device. With such a sliding stem fluid control valve it is desirable to have the flow capacity increase continually in a substantially linear manner as the valve is opened. In a proposed valve trim in the form of a cage with stacked disks, two different disks are used in an alternating configuration. In this configuration, a first flow disk has inlet and outlet slots cooperating with a plenum in a plenum disk, so that every other disk has no inlet openings to allow fluid flow to occur as the valve fluid control element travels through the stacked disks from a closed to an open position. Thus, a "stair step" in effect is created in the flow capacity characteristics for these prior valve trim stacked disk configurations, rather than the desired characteristic of having the flow capacity increase substantially linearly as the valve is opening.

SUMMARY OF THE INVENTION

In accordance with the principles of the present invention, there is provided a fluid pressure reduction device in a stacked disk configuration wherein the flow capacity increases continually in a substantially linear manner as a flow control element uncovers more of the stacked disk flow inlet openings.

In a fluid pressure reduction device of the present invention, there is provided a plurality of stacked disks including alternating plenum disks and flow disks. Each flow disk includes fluid inlet slots extending around a hollow disk center, and fluid outlet slots extending around the flow disk perimeter. Each plenum disk includes a plenum within the plenum disk and positioned in the stacked disk assembly with respect to the flow disk so as to fluidly communicate with the inlet slots and the outlet slots in adjacent flow disks. Each plenum disk also includes a hollow center with bypass slots located around the disk interior. Each bypass slot is aligned with a fluid inlet slot in the next flow disk to enable the fluid flow to continue into a plenum slot and then to travel out of the stacked disks through an outlet slot and thus eliminate a "dead band" area in the flow capacity.

The size and shape of the bypass slots can vary. An arched shape will minimize the stress created by the process pressure, however any shape could be used for the bypass slot so as to enable the fluid flow to reach the inlet slot in the next flow disk. The size (area) of the bypass slot can vary, and should be optimized to obtain the most linear flow capacity characteristics. However, the "stair step" effect will reoccur if the bypass slot is made too large, as this would allow too much flow to occur to the next inlet slot.

In initial prototypes using the present invention, the bypass slot was designed to use between 50% and 60% of the area in the minimum opening of the inlet slot of the next flow disk. Some processes and application may require other flow characteristics, such as an Equal Percentage Flow Characteristic, wherein there is a small amount of flow achieved towards the bottom of the travel of the fluid control element, and then the flow exponentially increases as the valve is opened further. This can be achieved by controlling the number of inlet and outlet slots in the flow disk. In the case of an Equal Percentage Flow Characteristic, the number of slots in the flow disk would be small in the bottom of the cage assembly, start to increase in number in the middle and would build to have all of the slots towards the top of the assembly. This technique can be formulated to acquire the required amount of area needed for different process requirements. The bypass slots again will eliminate the "stair step" effect and produce a more linear flow characteristic curve. In this arrangement there is a definite top and bottom to the cage assembly. However, the full number of bypass slots can be used in the plenum disk, and would not need to increase in number as they need to on the flow disk. The extra bypass slots would be a "dead end" and not allow the flow to exit the cage assembly.

In an alternative embodiment of the invention, a plurality of bypass slots are provided on the plenum disk, wherein a first group of bypass slots are on the plenum disk and are located to be aligned with the inlet slots of the flow disk immediately above the plenum disk. In addition, the plenum disk includes a second group of bypass slots which are located to be aligned with the inlet slots of the flow disk immediately beneath the plenum disk. This alternative embodiment provides an advantage wherein the flow characteristic linearization enhancement will work regardless of the top/bottom orientation of the stacked disks within the cage. This also eliminates the need to maintain a specific orientation of the cage during assembly, as the stacked disks in the cage are now top-to-bottom symmetrical. In addition, the slots can be located to eliminate any specific orientation concerns of the plenum disk. They can be designed such that there will always be a bypass slot on the plenum disk directly below the inlet slot on the flow disk regardless of the flow disk or plenum disk orientation.

In a further alternative embodiment, the bypass slot could simply become one continuous slot spanning the entire inside diameter of the plenum disk and fluidly communicating with the inlet slots of both the flow disks above and below the plenum disk. This allows the bypass flow for flow characteristic linearization enhancement while also eliminating the prior manufacturing orientation concerns. However, this technique would need to be tightly controlled, as the amount of the bypass slot area used with respect to the area of the inlet slots directly impacts the effectiveness of the characteristic enhancements as previously described.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
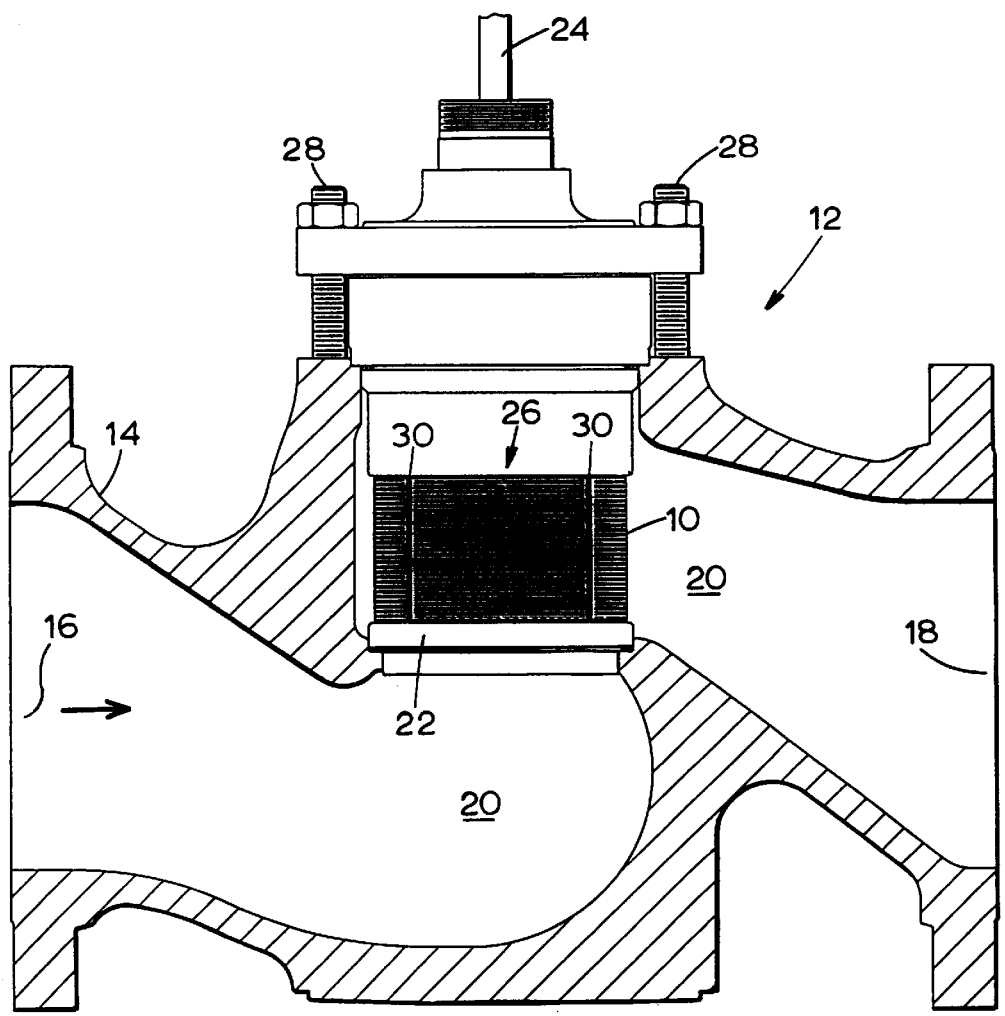
FIG. 1 is a cross-sectional view illustrating a fluid control valve containing a valve trim in the form of stacked disks forming a fluid pressure reduction device in accordance with the present invention.

Referring now to FIG. 1, there is illustrated a fluid pressure reduction device in accordance with the principles of the present invention in the form of a valve cage 10 having a plurality of stacked disks and mounted within a fluid control valve 12. Fluid control valve 12 includes a valve body 14 including a fluid inlet 16, a fluid outlet 18, and a connecting passageway 20 through the valve body.

A seat ring 22 is mounted within the valve body passageway 20 and cooperates with a valve operating member 24 to control fluid flow into the interior and through the exterior of the valve cage 10. The valve cage 10 may be maintained within the valve by conventional mounting means such as a cage retainer 26 and mounting bolts 28 engaging the valve bonnet portion of the valve in a known manner. A series of weld beads 30 on the outside of the valve cage 10 securely maintains the disks in an assembled stack. In a constructed preferred embodiment of the invention, each individual disk is coated with a nickel plating. The nickel plated disks are assembled into a stack which is placed in a fixture and subjected to a suitable stack loading and temperature to fuse the individual plated disks to each other. For large disks a series of bolts or other types of mechanical fasteners may be used to securely maintain the stacked disks assembled.

Figure 2:
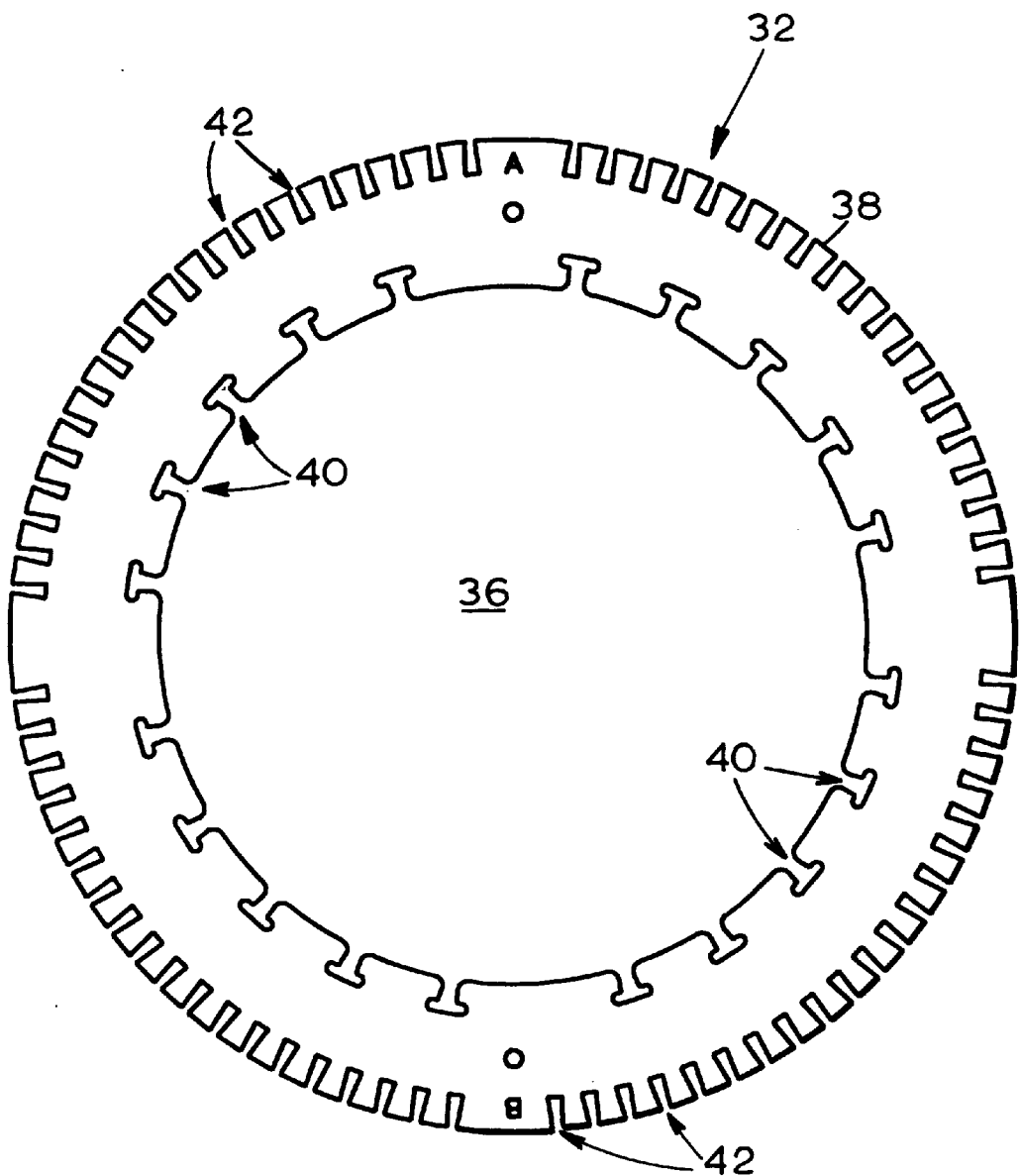
FIG. 2 is a plan view of a flow disk which is one of the alternating disks in the stacked disks in FIG. 1.
Figure 3:
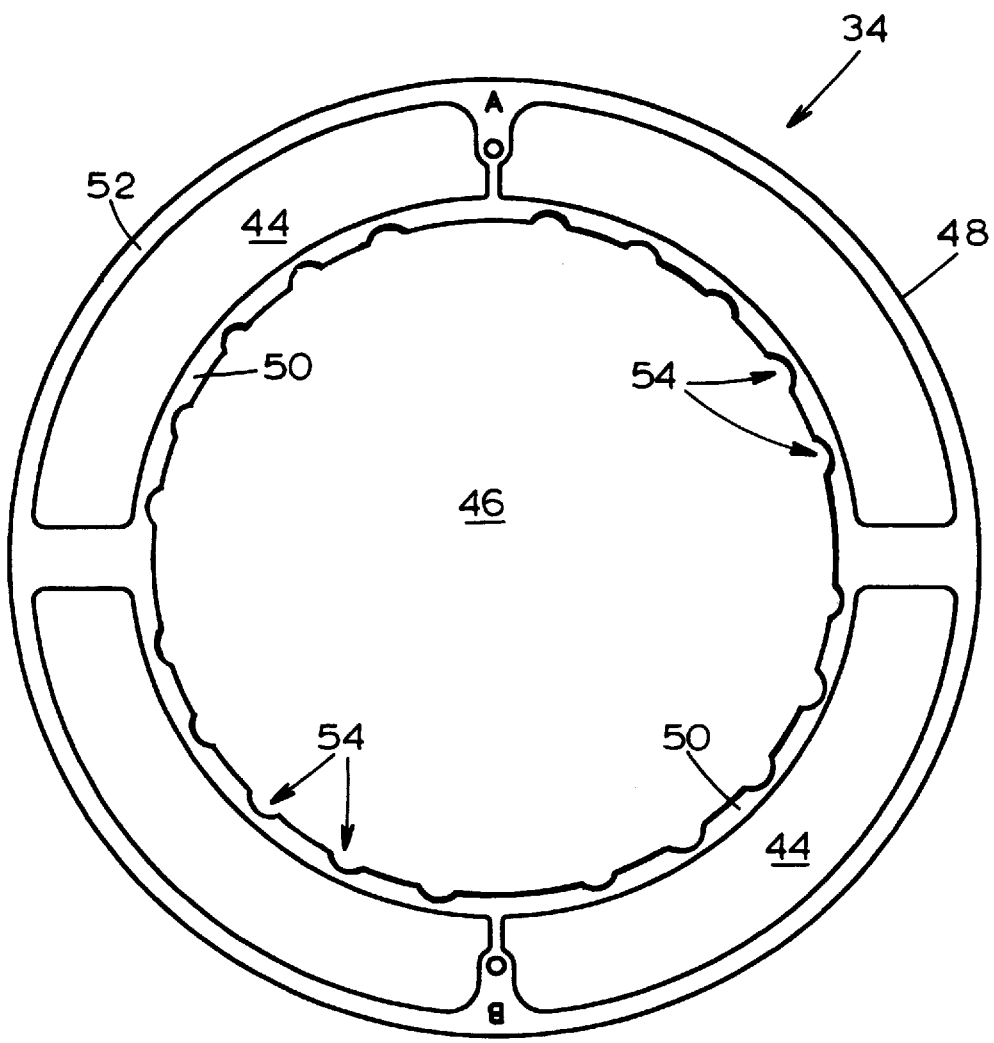
FIG. 3 is a plan view of a plenum disk which is the other alternating disk in the stacked disks in FIG. 1.

The valve 10 includes a plurality of stacked disks in an alternating disk configuration including a flow disk 32 shown in FIG. 2 alternating with a plenum disk 34 shown in FIG. 3. The flow disk 32 includes a hollow center portion 36 and an annular perimeter 38. A plurality of fluid inlet slots 40 each partially extends from disk center 36 towards the disk perimeter 38. A plurality of fluid outlet slots 42 each partially extends from the disk perimeter 38 towards the disk center 36.

On the plenum disk 34 shown in FIG. 3, there is provided one or more plenum slots 44 which extend entirely within the disk and between a hollow disk center 46 and a disk perimeter 48. Each plenum 44 extends between an inner disk portion 50 adjacent the hollow center portion 46 and an outer disk portion 52 which ends in the disk perimeter 48.

Each of the plenum disks 34 also includes a plurality of bypass slots 54 within the inner disk portion 50 and immediately adjacent the hollow center portion 46. Each bypass slot 54 extends from the hollow center portion 46 and within the inner disk portion 50, and towards the outer disk portion 52.

Figure 4:
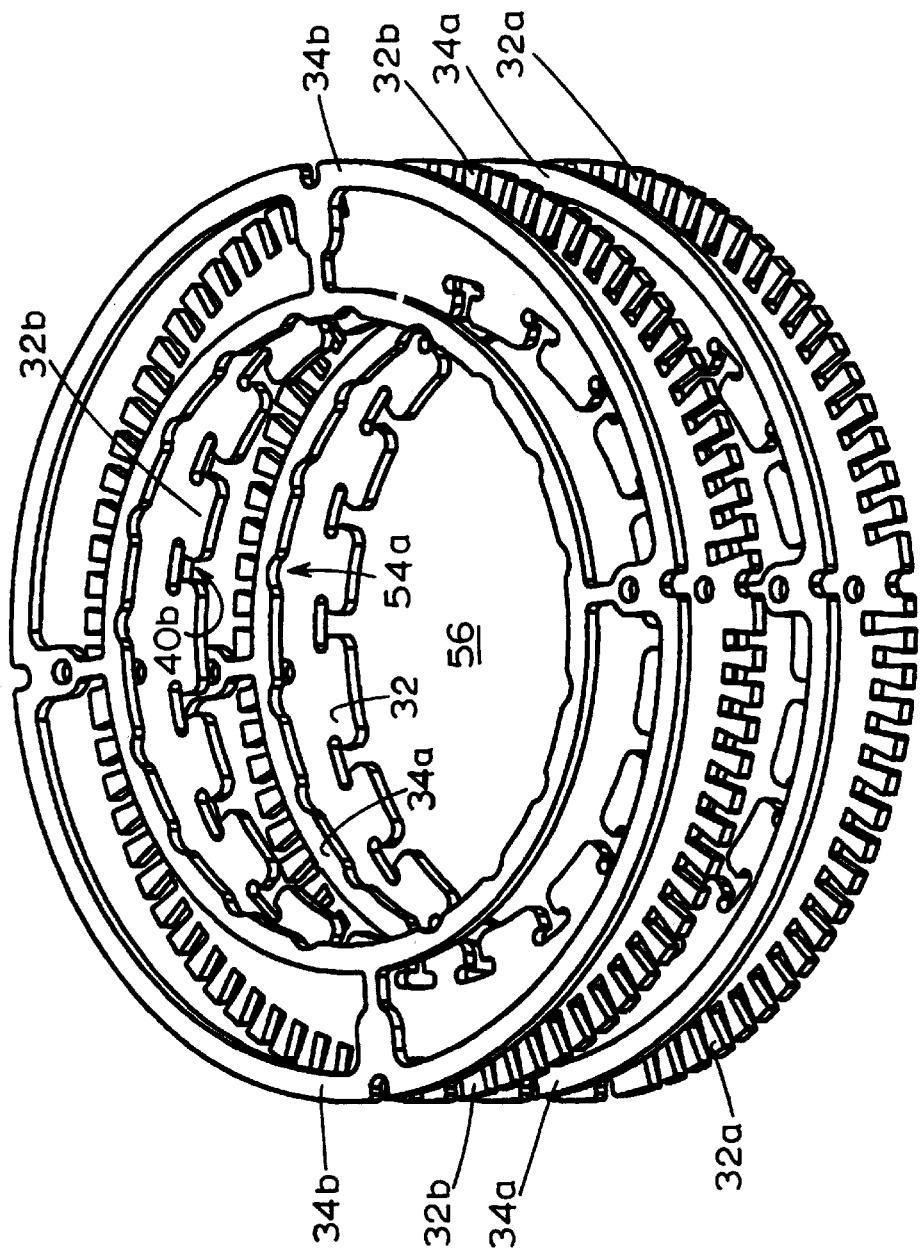
FIG. 4 is perspective view of four disks in the stacked disks of FIG. 1 illustrating a flow disk of FIG. 2 alternating with a plenum disk of FIG. 3.

Referring now to FIG. 4, there is shown in perspective a four disk stack which includes from the bottom to the top a flow disk 32a, a plenum disk 34a, a flow disk 32b, and a plenum disk 34b. In the stacked disk configuration of FIG. 4, a flow disk 32 is positioned with respect to a plenum disk 34 such that each of the fluid inlet slots 40 in a flow disk 32 fluidly communicates with a plenum slot 44 in an adjacent plenum disk 34. Also, each plenum slot 44 in the plenum disk 34 communicates with a number of fluid outlet slots 42 in an adjacent flow disk 32. Thus, fluid can flow from the center 56 of the stacked disks shown in FIG. 4 through a fluid inlet slot 40 in a flow disk 32 to plenum slots 44 in adjacent plenum disks 34 and to multiple fluid outlet slots 42 in the flow disk. Accordingly, the fluid flow path is split into two initial axial directions, then into the plenum slots 44 with multiple radial flow directions, and then is distributed through multiple outlet slots 42 in at least one of the flow disks 32.

In addition, as can be seen from FIG. 4, each bypass slot 54 is aligned with an inlet slot 40 in the next adjacent flow disk 32. In FIG. 4 for instance a bypass slot 54a in plenum disk 34a is aligned with an inlet slot 40b of the next adjacent flow disk 32b. Accordingly, fluid flow can also pass from the center 56 of the stacked disk configuration in FIG. 4 through the bypass slot 54a, into the inlet slot 40b, and then into fluidly connecting plenums and multiple outlet slots as previously described.

Utilizing the bypass slots 54 aligned with respective inlet slots 40 tends to smooth out or linearize the flow capacity characteristics of the valve trim 10. This minimizes the "stair step" flow capacity effect on opening of prior valve trims incorporating a flow disk and plenum disk configuration as in FIGS. 2 and 3, but without the bypass slots 54.

Figure 5:
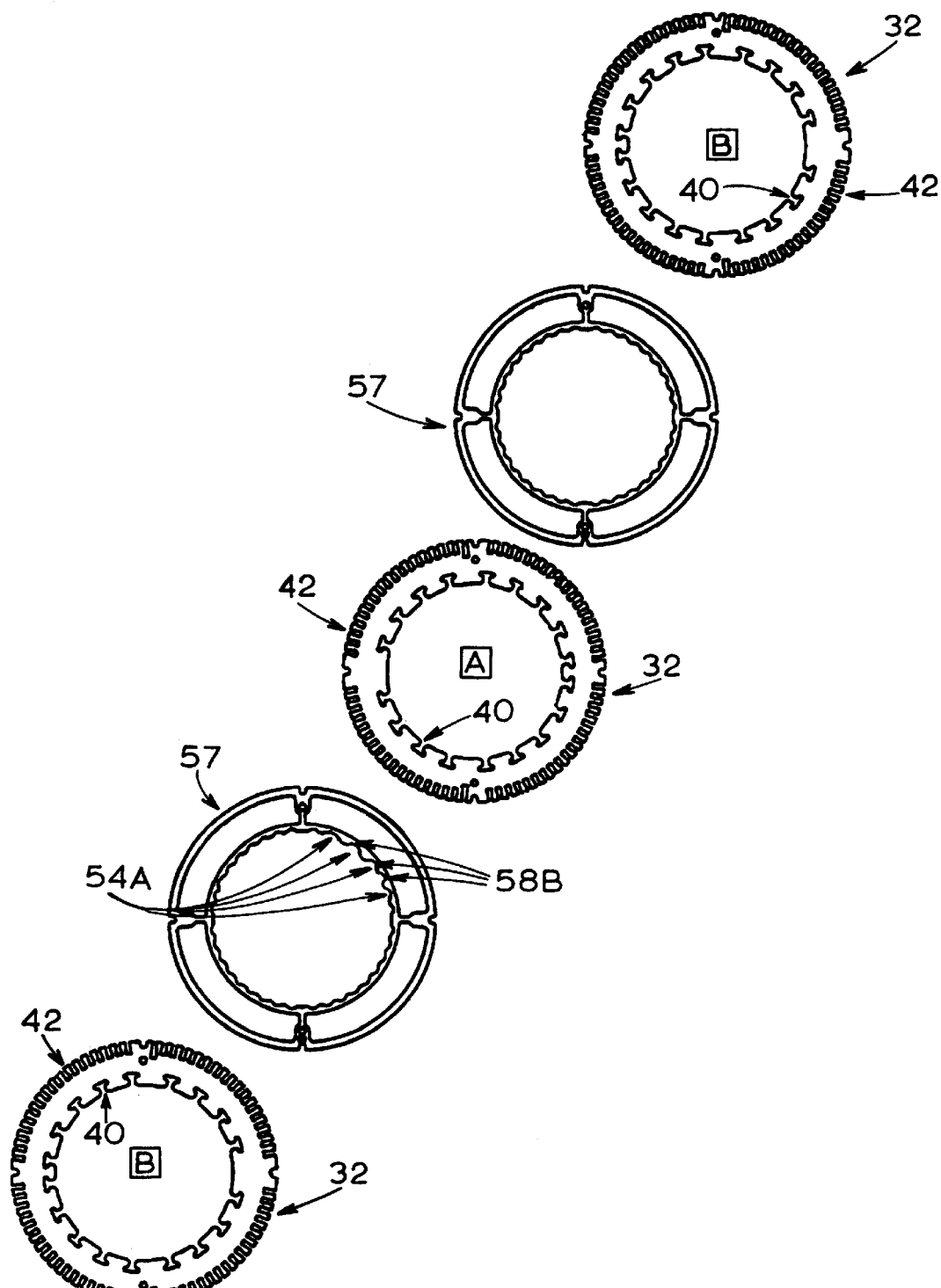
FIG. 5 is an exploded view with an alternative embodiment plenum disk having additional bypass slots to provide a symmetrical stacked disk configuration.

In the exploded view of FIG. 5, each of the flow disks 32 is the same as the flow disk 32 shown in FIG. 2. It may be noted that the uppermost as well as the lowermost flow disk 32 are labeled B whereas the intermediately located flow disk 32 is labeled A. Each of the plenum disks 57 is similar to the plenum disk 34 shown in FIG. 3, except for including a second set of the bypass slots 58 alternating with the bypass slots 54. For convenience, the bypass slots 54 are labeled A in FIG. 5, and the bypass slots 58 are labeled B.

The bypass slots 54 are located so as to be aligned with the bottom of the inlet slots 40 of the flow disk 32 immediately above. Also, the additional bypass slots 58 are aligned with the top of the inlet slots 40 of the flow disk 32 immediately beneath the plenum disk 57. Thus, for convenience, in illustration, the bypass slots 54 labeled A in plenum disk 57 are aligned with the inlet slots 40 of the flow disk 32 labeled A. Also, the bypass slots 58 labeled B are aligned with the inlet slots 40 of the flow disk 32 labeled B. Thus, the bypass slots in plenum disks 57 are located both above and below the inlet slots of the flow disks 32. This eases the manufacturing of the stacked disks, and the assembly and orientation of the disks in a cage configuration.

Alternatively, the bypass slots 54 and 58 can simply become one annular bypass slot expanding the entire inside diameter of the plenum disk so as to align the annular slot both above and below the inlet slots in adjacent flow disks.

It is to be realized that the bypass slots feature of the present invention can be utilized with other disk configurations different than the inlet/outlet slots in a first disk and the plenum slots in a second disk described herein. For example, a first disk with inlet passages and a second disk with overlapping outlet passages can incorporate bypass slots in the second disk in accordance with the teachings herein.

The foregoing detailed description has been given for clearness of understanding only, and no unnecessary limitations should be understood therefrom, as modification will be obvious to those skilled in the art.

What is claimed is:

1. A fluid pressure reduction device comprising:

a plurality of stacked disks having a perimeter and hollow centers aligned along a longitudinal axis;

said stacked disks including alternating first and second disks;

said first disk having (a) fluid inlet stage slots partially extending from the disk center towards the disk perimeter, and (b) fluid outlet stage slots partially extending from the disk perimeter towards the disk center;

said second disk having (c) at least one plenum slot extending through the disk, and (d) bypass slots partially extending from the disk center towards the disk perimeter and aligned with the fluid inlet stage slots in an adjacent first disk; and said disks selectively positioned in said stack to enable fluid flow from the disk center to said fluid inlet stage slots in one disk and from said bypass slots in an adjacent second disk to said fluid inlet stage slots in said one disk, then to said plenum slots in adjacent disks and to said fluid outlet stage slots in at least said one disk, wherein the fluid flow path is split into two initial axial directions, then into said plenum slots with multiple radial flow directions, and then distributed through multiple outlet stage slots in at least said one disk.

2. A fluid pressure reduction device according to claim 1, wherein said bypass slots are aligned with inlet stage slots of respective adjacent first disks on opposite sides of the second disk.

3. A fluid pressure reduction device according to claim 1, wherein said bypass slots are each formed as half moon shaped profiles.

4. A fluid pressure reduction device comprising:

a plurality of stacked disks having a perimeter and hollow centers aligned along a longitudinal axis;

said stacked disks including alternating flow disks and plenum disks;

said flow disk having (a) fluid inlet stage slots partially extending from the flow disk center towards the flow disk perimeter, and (b) fluid outlet stage slots partially extending from the flow disk perimeter towards the flow disk center;

said plenum disk having (c) at least one plenum slot extending through the plenum disk, and (d) bypass slots partially extending from the plenum disk center towards the plenum disk perimeter and aligned with the fluid inlet stage slots in respective adjacent flow disks on opposite sides of said plenum disk; and said disks selectively positioned in said stack to enable fluid flow from the disk center to said fluid inlet stage slots in one flow disk and from said bypass slots in an adjacent plenum disk to said fluid inlet stage slots in said one flow disk and in said respective adjacent flow disk on the opposite side of said plenum disk, then to said plenum slots in adjacent disks and to said fluid outlet stage slots in at least said one disk, wherein the fluid flow path is split into two initial axial directions, then into said plenum slots with multiple radial flow directions, and then distributed through multiple outlet stage slots in at least said one disk.

5. A fluid pressure reduction device according to claim 4, wherein said bypass slots are each formed as half moon shaped profiles.

* * * * *